US008681487B2

(12) United States Patent
Peters et al.

(10) Patent No.: US 8,681,487 B2
(45) Date of Patent: Mar. 25, 2014

(54) ELECTRONIC APPARATUS COMPRISING A FLEXIBLE DISPLAY WITH PRESSURE SPREADING MEANS

(75) Inventors: Gijs Peters, Eindhoven (NL); Hendrik Dirk Visser, Waalre (NL); Michael Johannes Anna Maria Walters, Eindhoven (NL); David Johannes Elisabeth Bemelmans, 'S-Hertogenbosch (NL)

(73) Assignee: Creator Technology B.V., Breda (NL)

( * ) Notice: Subject to any disclaimer, the term of this patent is extended or adjusted under 35 U.S.C. 154(b) by 965 days.

(21) Appl. No.: 12/597,351

(22) PCT Filed: Apr. 25, 2008

(86) PCT No.: PCT/NL2008/050252
§ 371 (c)(1), (2), (4) Date: Jun. 3, 2010

(87) PCT Pub. No.: WO2008/133513
PCT Pub. Date: Nov. 6, 2008

(65) Prior Publication Data
US 2010/0253604 A1 Oct. 7, 2010

Related U.S. Application Data

(60) Provisional application No. 60/913,950, filed on Apr. 25, 2007.

(51) Int. Cl.
*G06F 1/16* (2006.01)

(52) U.S. Cl.
USPC .................................. 361/679.21; 361/679.3

(58) Field of Classification Search
None
See application file for complete search history.

(56) References Cited

U.S. PATENT DOCUMENTS

| | | | | |
|---|---|---|---|---|
| 6,269,225 | B1 * | 7/2001 | Sato et al. | 396/429 |
| 6,762,929 | B2 * | 7/2004 | Sawyer | 361/679.05 |
| 7,184,086 | B2 * | 2/2007 | Tamura | 348/333.06 |
| 7,463,238 | B2 * | 12/2008 | Funkhouser et al. | 345/107 |
| 7,558,057 | B1 * | 7/2009 | Naksen et al. | 361/679.56 |
| 7,636,085 | B2 * | 12/2009 | Yang | 345/204 |

(Continued)

FOREIGN PATENT DOCUMENTS

| | | |
|---|---|---|
| JP | 9-73072 | 3/1997 |
| JP | 10-40004 | 2/1998 |

(Continued)

OTHER PUBLICATIONS

Japan Patent Office, Office Action, Patent Application Serial No. 2010-506103, Oct. 30, 2012, Japan.

(Continued)

*Primary Examiner* — Anthony Q Edwards

(57) ABSTRACT

The invention relates to an apparatus (20) comprising a flexible display (23) with a front surface and a back surface, wherein the back surface is provided with an adhered layer of an elastic material (24) for dissipating external pressure applied to the front surface. The thickness of the elastic material is optimized to provide sufficient resistance to external pressure on one hand, and to ensure that the plane of a weakest layer of the display device substantially coincides with the neutral line. Connecting the display and the layer of elastic material (24) using an adhesive prevents small particles to enter an area between the layer (24) and the back surface of the display.

12 Claims, 3 Drawing Sheets

(56) References Cited

U.S. PATENT DOCUMENTS

| | | | | |
|---|---|---|---|---|
| 8,009,421 | B2 * | 8/2011 | Misawa | 361/679.55 |
| 8,228,667 | B2 * | 7/2012 | Ma | 361/679.01 |
| 2001/0008582 | A1 * | 7/2001 | Sato et al. | 396/429 |
| 2003/0048256 | A1 | 3/2003 | Salmon | |
| 2004/0183958 | A1 * | 9/2004 | Akiyama et al. | 349/58 |
| 2006/0038745 | A1 * | 2/2006 | Naksen et al. | 345/30 |
| 2006/0209218 | A1 * | 9/2006 | Lee et al. | 349/1 |
| 2006/0262260 | A1 * | 11/2006 | Majumdar et al. | 349/122 |
| 2007/0241002 | A1 * | 10/2007 | Wu et al. | 206/150 |
| 2008/0247126 | A1 * | 10/2008 | Otsuka et al. | 361/681 |
| 2009/0219247 | A1 * | 9/2009 | Watanabe et al. | 345/157 |

FOREIGN PATENT DOCUMENTS

| | | | |
|---|---|---|---|
| JP | 2002-278466 | | 9/2002 |
| TW | 200609712 | A | 3/2006 |
| WO | WO 2004/031927 | A | 4/2004 |
| WO | WO 2005/027582 | A1 | 3/2005 |
| WO | WO 2005/114309 | A | 12/2005 |
| WO | WO 2006/090434 | A1 | 8/2006 |
| WO | WO 2006/129232 | A | 12/2006 |

OTHER PUBLICATIONS

International Search Report dated Aug. 18, 2008 for PCT/NL2008/050252.

* cited by examiner

ELECTRONIC APPARATUS COMPRISING A FLEXIBLE DISPLAY WITH PRESSURE SPREADING MEANS

FIELD OF THE INVENTION

The invention relates to an electronic apparatus comprising a flexible display with a front surface and a back surface.

BACKGROUND OF THE INVENTION

An embodiment of the electronic device as is set forth in the opening paragraph is known from WO 2004/047059. The known electronic device comprises a flexible display conceived to be wound around a suitable roller for storage purposes. The known electronic device comprises means for counteracting mechanical damage and/or scratching of the front surface and the back surface of the flexible display. For this purpose the known electronic device is arranged with rigid bars cooperating with the back surface of the flexible display. The bars are arranged to function as spacers preventing the back surface from touching the front surface when the flexible display is stored. In order to prevent the back surface of the flexible display from being damaged by the spacer bars, a layer of flexible material is provided between the spacer bars and the back surface of the known display. The known flexible material may be integrated with the flexible display or may be loosely provided in an area between the back surface of the flexible display and the spacer bars.

It is a disadvantage of the known electronic device in that flexible display, which is usually manufactured from a delicate material, may be damaged by a suitable pointer, for example a finger or a pen, especially at areas coinciding with the spacer bar. In addition, the spacer bars cause small bending radii for the flexible display which may cause damage to a multilayer structure forming the flexible display.

SUMMARY OF THE INVENTION

It is an object of the invention to provide an electronic device arranged with a flexible display in which the area of the display is effectively protected against indentation.

To this end in the electronic apparatus according to the invention the back surface is provided with an adhered layer of an elastic material for dissipating external pressure applied to the front surface.

The technical measure of the invention is based on the insight that a thin flexible display, built up from several layers, is very sensitive to local pressure when it is on a hard base. For example, when a portion of a flexible display is positioned in or next to a substantially rigid housing, undesirable damage of a material of the flexible display may occur due to the fact that the rigid housing purposefully does not have any degree of freedom, like bending in response to application of an external force. Therefore, in accordance with the invention it is advantageous for a portion of the flexible display being positioned in or next to a housing to adhere the layer of the elastic material to a surface of said portion facing the housing. In this way the layer of the elastic material is provided between the flexible display and the rigid housing acting as a suitable cushion for dissipating any pressure applied to the flexible display.

Alternatively, when the flexible display is lying on a rigid surface, like a table and when a pressure is applied to it with an object, like a pencil or so, indentation damage is easily introduced. In addition, particles may fall on the unrolled display. When the display is rolled up, these particles may be pressed into the display and cause damage. By providing an elastic material adhered to the back surface of the display the amount of elastic energy in the display is not influenced thereby providing a suitable degree of freedom with respect to displacement upon application of an external force. Preferably, a plane of the flexible display substantially comprises a neutral line corresponding to minimum mechanical stress during bending. A response of the flexible display to an application of the external force is discussed in more detail with reference to FIG. 1. Therefore, by addition of an elastic material, like a rubber or a foam layer at the back surface of the flexible display, the display properties with respect to resistance to local pressure improve, in other words, higher pressures can be applied with the same tip before damage is introduced. The indentation force is distributed over a larger volume if the base is compliant. In particular, in case when a display effect layer of the flexible display is based on electrophoretic capsules, undesirable deterioration of the display properties due to smashing of capsules is prevented.

In an embodiment of the electronic device according to the invention the front surface comprises an active area and a non-active area, the elastic material being adhered to the non-active area.

This feature is based on the understanding that non-active areas, notably non-luminescent areas, are provided on the flexible display, said areas usually being located at edge portions of the display area and serve for providing electrical leads for feeding the active area, notably the luminescent area of the display. Damage to the leads introduce a line fault in the display. To protect the electronic device from exhibiting line faults in the flexible display, the edge portions comprising leads are protected by an elastic material. Preferably, the elastic material is chosen to be the same as is used for protection of the back surface of the display. This has an additional advantage for electrophoretic displays. It is noted that also in the non-active area electrophoretic processes may occur. This leads to a non-finitesmall luminescence of the non-active areas. By covering these areas by a protective, notably, elastic material, which is preferably not transparent, such parasitic luminiscence can be mitigated. In a preferred embodiment of the electronic device according to the invention the flexible display comprises edge portions, the edge portions being sandwiched between the elastic material. Preferably, the elastic material comprises a foam layer or a rubber layer.

These and other aspects of the invention will be discussed in further detail with reference to figures.

DETAILED DESCRIPTION

Figure 1:
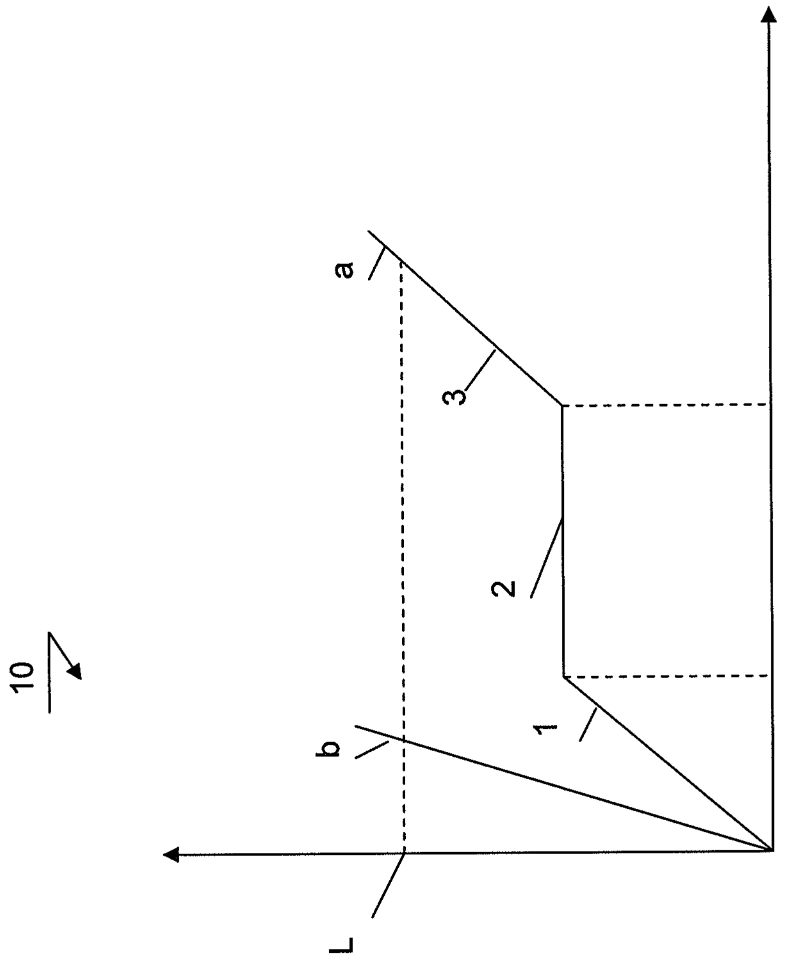
FIG. 1 presents a schematic graph of a force-displacement curve for a foam.

FIG. 1 presents a schematic graph of a force-displacement curve for a foam and a rubber. The graph illustrates that a foam layer is preferred above a rubber layer. The graph 10 schematically shows a displacement (abscissa) for an applied force (ordinate). The graph (a) relates to a foam, whereas the graph (b) relates to a rubber material From analysis of regions 1, 2, 3 it follows that when the foam is intended the force increases substantially linear with the displacement. The walls of the cells, from which the foam is built up, function as supports. In the region 2 such supports start to collapse. Therefore, the indentation depth increases without a further increase of an applied external force. In this stage the contact surface of the used tip with the foam increases. This means that the locally applied pressure and, therefore, the change upon damage decreases. In the region 3 cell walls of the foam material are completely pressed together. No more air is present in the cells. Now the indentation of the foam is exactly the same as the indentation of the pure material out of which the cells are made. The force-displacement curve of a rubber material (b) shows a linear behavior. The three different regions are not present, which means that a critical force L at which damage is introduced will be reached sooner.

Figure 2:
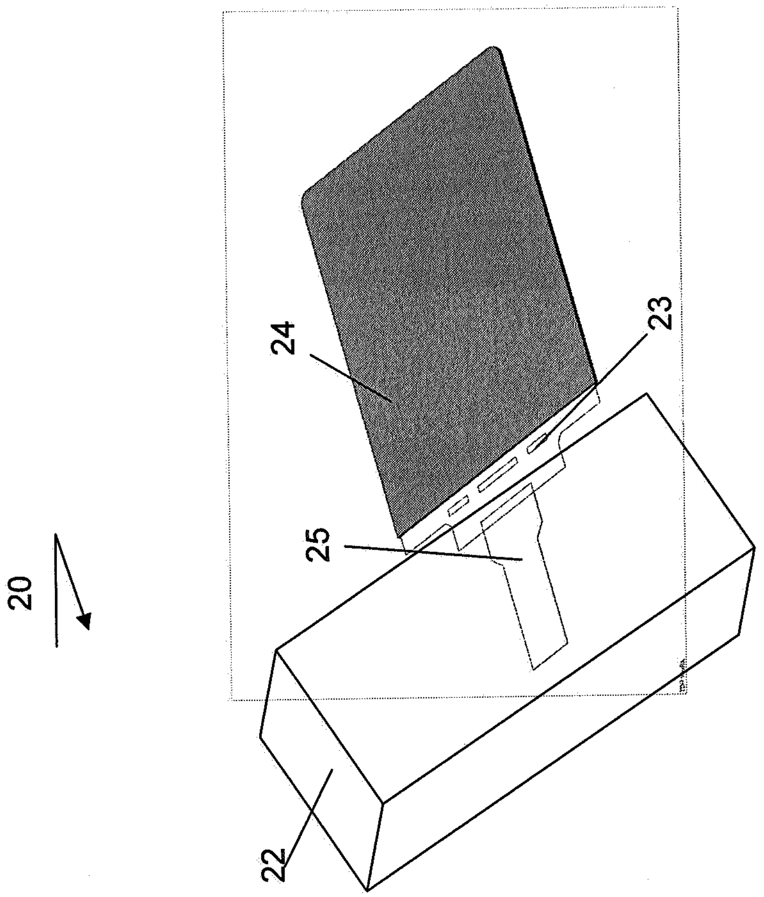
FIG. 2 presents a schematic view of an embodiment of the flexible display provided with a layer of elastic material.

FIG. 2 presents a schematic view of an embodiment of the flexible display provided with a layer of elastic material. The electronic device 20, notably a monitor, a portable computer, a telephone, or the like comprises a flexible display 23 which can, for example be wound around a suitable roller (not shown) in the storage housing 22. The flexible display may also be wrapped about a housing of a suitable electronic device. It will be appreciated that the view of FIG. 2 presents a rear view of the device. The flexible display 23 preferably operates based on the electrophoretic technology. A front surface of such device is arranged to be luminescent. The back surface of the flexible display 23 is provided with a layer of elastic material 24, which is adhered to the back surface of the display. The thickness of the elastic material is optimized to provide sufficient resistance to external pressure on one hand, and to ensure that the plane of the weakest layer of the display substantially coincides with the neutral line. The weakest layer of the display will be seen as a structure most sensitive to damage due to bending. Usually, a layer comprising electronics or a display effect layer is regarded as such weakest layer. In addition, elasticity modulus of the elastic material 24 can be optimized to improve pressure spreading properties of the elastic material 24. The neutral line is defined as the line of minimum mechanical stress during bending. In addition, the back surface of the display is protected against scratches, imprint of particles and undesired ultra-violet irradiation from surroundings. Connecting the display and the layer of elastic material 24 using an adhesive prevents small particles to enter an area between the layer 24 and the back surface of the display. Accordingly, by provision of the elastic material adhered to the back surface of the flexible, notably flexible display, the latter is better protected against local pressure and indentation, as well as against undesired UV light. Preferably, the foam is selected for the elastic layer 24 and is glued to the display.

Figure 3:
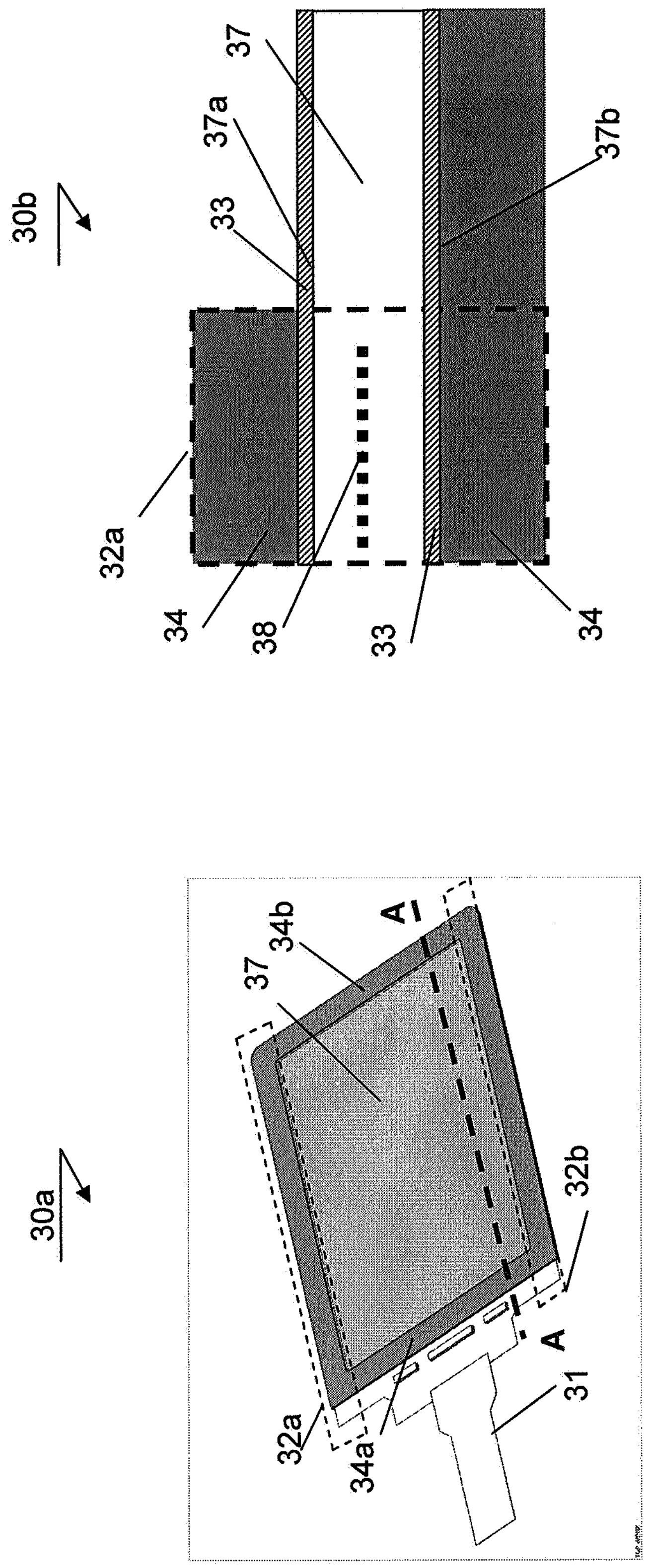
FIG. 3 presents a schematic view of a further embodiment of the flexible display provided with a layer of elastic material.

FIG. 3 presents a schematic view of a further embodiment of the flexible display provided with a layer of elastic material. In the view 30*a* only a flexible display is schematically illustrated for clarity reasons. The view 30*a* shows a front portion of the display area 37, provided with edge protection layers of elastic material, comprising, notably a foam layer or a rubber layer. The edge portions, schematically illustrated by 32*a*, 32*b* usually comprise electric leads feeding the display area 37. Also regions 34*a*, 34*b* are preferably provided with the protection layer comprising elastic material. The view 300*b* shows a cross-section of the flexible display, taken along the line A-A. It is seen that the layer comprising the flexible display is sandwiched between the layers of elastic material 34 in the edge portion 32*a* of the flexible display. The elastic material, notably a foam or a rubber material is preferably adhered to the front surface or the back surface of the flexible display by means of a suitable glue. It will be appreciated that by application the elastic material around the active area 37 of the display the leads 38 are also protected. In addition, due to the presence of a layer of material on the front surface of the display 37, particles that are present on the display area cannot induce damage to the font surface of the display when the display is being stored in a rolled position. Also, parasitic luminescence occurring at the edge portions is counteracted thereby improving the quality of the device as a whole. It will be appreciated that the black reflection of the display as observed by a human eye can be optimized by choosing a suitable color of the elastic material framing the active area of the flexible display 37. By optimizing the respective thicknesses of the layers 34, for example by letting them to be equal, a plane of an electronically active layer of the flexible display will comprise a neutral line corresponding to a minimum mechanical stress during bending. Thereby mechanical stress to the potentially fragile components, like electronics, of the flexible display during use is minimized.

It will be appreciated that although specific embodiments of the electronic device according to the invention are discussed separately for clarity purposes, interchangeability of compatible features discussed with reference to isolated figures is envisaged. While specific embodiments have been described above, it will be appreciated that the invention may be practiced otherwise than as described. The descriptions above are intended to be illustrative, not limiting. Thus, it will be apparent to one skilled in the art that modifications may be made to the invention as described in the foregoing without departing from the scope of the claims set out below.

The invention claimed is:

1. An electronic apparatus comprising a flexible display with a front surface and a back surface, wherein
the back surface is provided with an adhered layer of an elastic material for dissipating external pressure applied to the front surface, wherein the elastic material comprises foam or rubber.

2. An electronic apparatus according to claim 1, wherein the flexible display comprises an electronically active layer, a plane of the electronically active layer substantially comprising a neutral line corresponding to a minimum mechanical stress during bending.

3. An electronic apparatus according to claim 2, wherein the front surface comprises an active area and a non-active area, further comprising an edge protection layer of the elastic material adhered to the non-active area.

4. An electronic apparatus according to claim 3, wherein the flexible display comprises edge portions, the edge portions being sandwiched between the adhered layer and the edge protection layer.

5. An electronic device according to claim 3, wherein the edge protection layer is provided only on the non-active area.

6. An electronic apparatus according to claim 1,
wherein a portion of the flexible display is positioned in a housing, the adhered layer being adhered to a surface of said portion facing the housing.

7. An electronic apparatus according to claim 1, wherein the front surface comprises an active area and a non-active area, further comprising an edge protection layer of the elastic material being adhered to the non-active area.

8. An electronic apparatus according to claim 7, wherein the flexible display comprises edge portions, the edge portions being sandwiched between the adhered layer and the edge protection layer.

9. An electronic device according to claim 7, wherein the edge protection layer is provided only on the non-active area.

10. An electronic apparatus according to claim 7, wherein a portion of the flexible display is positioned in a housing, the adhered layer being adhered to a surface of said portion facing the housing.

11. An electronic apparatus according to claim 7, wherein the elastic material comprises foam.

12. An electronic apparatus according to claim 1, wherein the elastic material comprises foam.

* * * * *